(12) United States Patent
Lewis et al.

(10) Patent No.: US 6,253,177 B1
(45) Date of Patent: Jun. 26, 2001

(54) METHOD AND SYSTEM FOR AUTOMATICALLY DETERMINING WHETHER TO UPDATE A LANGUAGE MODEL BASED UPON USER AMENDMENTS TO DICTATED TEXT

(75) Inventors: James R. Lewis, Delray Beach, FL (US); Barbara Ballard, Kansas City, MO (US)

(73) Assignee: International Business Machines Corp., Armonk, NY (US)

(*) Notice: Subject to any disclaimer, the term of this patent is extended or adjusted under 35 U.S.C. 154(b) by 0 days.

(21) Appl. No.: 09/265,229

(22) Filed: Mar. 8, 1999

(51) Int. Cl.[7] .................................................. G10L 15/26
(52) U.S. Cl. ........................................... 704/235; 704/255
(58) Field of Search .................................... 704/235, 236, 704/251, 255, 256, 257, 252, 254, 270, 272, 275, 278

(56) References Cited

U.S. PATENT DOCUMENTS

| | | | |
|---|---|---|---|
| 5,465,317 | * 11/1995 | Epstein | 704/236 |
| 5,680,511 | * 10/1997 | Baker et al. | 704/257 |
| 5,852,801 | * 12/1998 | Hon et al. | 704/244 |
| 5,970,460 | * 10/1999 | Bunce et al. | 704/278 |
| 5,995,928 | * 11/1999 | Nguyen et al. | 704/251 |
| 6,081,772 | * 6/2000 | Lewis | 704/1 |

FOREIGN PATENT DOCUMENTS

| | | | | |
|---|---|---|---|---|
| 0840288 A2 | * | 5/1998 | (EP) | G10L/3/00 |
| 0840289 A2 | * | 5/1998 | (EP) | G10I/3/00 |
| 0841655 A2 | * | 5/1998 | (EP) | G10L/3/00 |
| 2347774 | * | 9/2000 | (GB) | G10L/15/22 |

OTHER PUBLICATIONS

IBM Technical Disclosure Bulletin. Improved Correction of Speech Recognition through Audio Playback. Jun. 1993.*
IBM Technical Disclosure Bulletin. Improved "Added–Word" User Interface Using Integrated Automatic Speech and Handwriting Recognition. Feb. 1993.*

* cited by examiner

*Primary Examiner*—Richemond Dorvil
(74) *Attorney, Agent, or Firm*—Akerman Senterfitt (57) ABSTRACT

In a computer speech dictation system, a method and system for automatically determining whether to update a language model based upon user amendments to text in a dictated word processing document. The method includes the steps of monitoring a user's text-amending input to an application program for amending the dictated text and subsequently performing processing responsive to the monitoring step to determine whether the text-amending input corrects a misrecognized word in the dictated text. If the test amending input corrects a misrecognized word, the system updates a language model based upon the text which has been amended.

18 Claims, 7 Drawing Sheets

METHOD AND SYSTEM FOR AUTOMATICALLY DETERMINING WHETHER TO UPDATE A LANGUAGE MODEL BASED UPON USER AMENDMENTS TO DICTATED TEXT

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of computer speech recognition and more particularly to a method and system in which a speech recognition application can automatically determine whether a user implemented amendment to dictated text should serve as a basis to update a language model.

2. Description of the Related Art

Speech recognition is the process by which an acoustic signal received by microphone is converted to a set of words by a computer. These recognized words may then be used in a variety of computer software applications for purposes such as document preparation, data entry and command and control. Speech recognition is generally a difficult problem due to the wide variety pronunciations, individual accents and speech characteristics of individual speakers. Consequently, language models are often used to help reduce the search space of possible words and to resolve ambiguities as between similar sounding words. Such language models tend to be statistically based systems and can be provided in a variety of forms. The simplest language model can be specified as a finite state network, where the permissible words following each word are given explicitly. However, more sophisticated language models have also been developed which are specified in terms of a context specified grammar.

Since each particular user will tend to have their own style of speaking, it is important that the attributes of such speaking style be adapted to the language model. By continuously updating the language model, it is possible to improve the overall accuracy of the speech recognition process for that user and thereby permit greater efficiencies. Accordingly, it is desirable to update the language model for each particular user on a regular basis. This updating process may be accomplished by various means. For example, the speech recognition application may be provided with sample text in some instances as examples of a particular users' speaking style. This information may thereafter be used, if suitable, to update the language model. Another method for updating the language model involves making note of user- "corrections" to misrecognized words in dictated text. However, this method can be cumbersome as it is necessary for the user to distinguish between amendments to text which are corrections to misrecognized words as compared to those which are merely additions or revisions to text. Corrections to misrecognized words are appropriately considered for updating the language model whereas other additions or revisions to text for other reasons are not necessarily so. The difficulty for the speech recognition application is distinguishing one type of amendment to the document from another.

SUMMARY OF THE INVENTION

The invention concerns a method and system for automatically determining whether to update a language model in a speech recognition system based upon user amendments to text in a dictated word processing document. The method involves monitoring one or more text-amending inputs to an application program for amending the text. Text-amending inputs are any kind of user initiated input which can be used to amend a word processing document. Examples of such text-amending inputs include keyboard entries to type in text, mouse movements and clicks which cause selection or de-selection of certain text, backspace and delete key operations which cause text to be removed from the word processing document and any other such similar operations which a user can perform in the course of amending a word processing document text.

The second step involves processing performed in response to the monitoring step to determine whether the text-amending input corrects a misrecognized word in the dictated text. This is accomplished by applying certain heuristic rules which permit such a determination. For example, the processing step can involve determining whether the text amending input has caused dictated text to be selected and determining whether new text has been inserted within the selected text.

Alternatively, or in addition thereto, the processing step can involve determining whether a text amending input has caused dictated text to be selected; determining whether the selected text has been deleted by the text amending input; determining whether the cursor has not been moved; and determining whether a text-amending input has caused new text to be inserted in place of the deleted text. Where these user inputs have all occurred, the system can reasonably conclude that a misrecognized word has been deleted and replaced with a correct word.

According to another aspect of the invention, the processing step can involve determining whether a text amending input has caused the positioning of a cursor over an existing word in the dictated text and determining whether the existing word has been overwritten as a result of a subsequent text amending input. Based upon such inputs, the system can reasonably conclude that a misrecognized word has been deleted and replaced with a correct word.

According to still another aspect of the invention, the processing step can involve determining whether the text amending input is the addition of new text to the dictated text and determining whether a further text amending input is the selection and deletion of text immediately contiguous to the new text. This would be an indication that a misrecognized word has been replaced with a correct word.

According to yet another aspect of the invention, the processing step can involve determining whether the text amending input is the addition of new text to the dictated text, and determining whether a further text amending input is the deletion of text immediately contiguous to the new text by operation of either a delete key or a backspace key.

BRIEF DESCRIPTION OF THE DRAWINGS

There are presently shown in the drawings embodiments which are presently preferred, it being understood, however, that the invention is not so limited to the precise arrangements and instrumentalities shown, wherein.

DETAILED DESCRIPTION OF THE INVENTION

Figure 1:
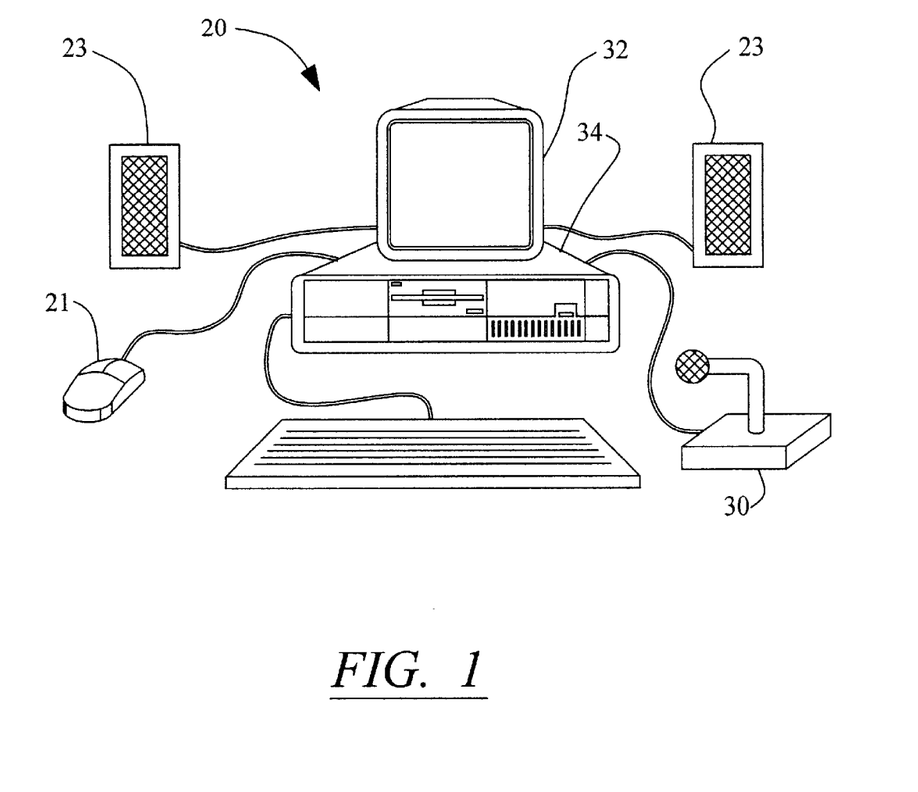
FIG. 1 shows a computer system for speech recognition on which the system of the invention can be used.

FIG. 1 shows a typical computer system 20 for use in conjunction with the present invention. The system is preferably comprised of a computer 34 including a central processing unit (CPU), one or more memory devices and associated circuitry. The system also includes a microphone 30 operatively connected to the computer system through suitable interface circuitry or "sound board" (not shown), and at least one user interface display unit 32 such as a video data terminal (VDT) operatively connected thereto. The CPU can be comprised of any suitable microprocessor or other electronic processing unit, as is well known to those skilled in the art. An example of such a CPU would include the Pentium or Pentium II brand microprocessor available from Intel Corporation or any similar microprocessor. Speakers 23, as well as an interface device, such as mouse 21, can also be provided with the system, but are not necessary for operation of the invention as described herein.

The various hardware requirements for the computer system as described herein can generally be satisfied by any one of many commercially available high speed multimedia personal computers offered by manufacturers such as International Business Machines Corporation (IBM), Compaq, Hewlett Packard, or Apple Computers.

Figure 2:
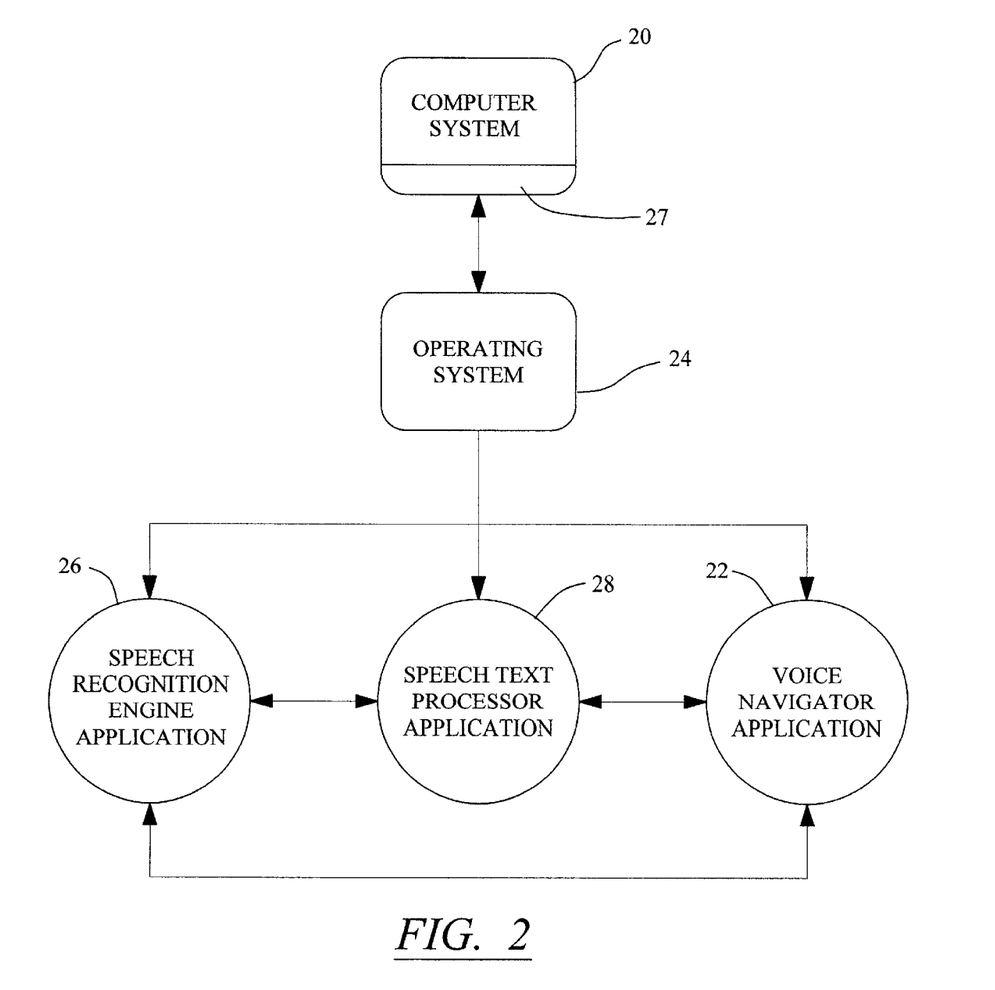
FIG. 2 is a block diagram showing a typical high level architecture for the computer system in FIG. 1.

FIG. 2 illustrates a typical architecture for a speech recognition system in computer 20. As shown in FIG. 2, the system typically includes an operating system 24 and a speech recognition engine application 26. A speech text processor application 28 and a voice navigator application 22 can also be provided. In FIG. 2, the speech recognition engine 26, speech text processor 28 and the voice navigator 22 are shown as separate application programs. It should be noted however that the invention is not limited in this regard, and these various application could, of course be implemented as a single, more complex applications program. Also, if no other speech controlled application programs are to be operated in conjunction with the speech text processor application and speech recognition engine, then the system can be modified to operate without the voice navigator application. The voice navigator primarily helps coordinate the operation of the speech recognition engine application.

In a preferred embodiment which shall be discussed herein, operating system 24 is one of the Windows family of operating systems, such as Windows NT, Windows 95 or Windows 98 which are available from Microsoft Corporation of Redmond, Washington. However, the system is not limited in this regard, and the invention can also be used with any other type of computer operating system. The system as disclosed herein can be implemented by a programmer, using commercially available development tools for the operating systems described above. As shown in FIG. 2, computer system 20 includes a computer memory device 27, which is preferably comprised of an electronic random access memory and a bulk data storage medium, such as a magnetic disk drive.

Audio signals representative of sound received in microphone 30 are processed within computer 20 using conventional computer audio circuitry so as to be made available to the operating system 24 in digitized form. The audio signals received by the computer are conventionally provided to the speech recognition engine application 26 via the computer operating system 24 in order to perform speech recognition functions. As in conventional speech recognition systems, the audio signals are processed by the speech recognition engine 26 to identify words spoken by a user into microphone 30.

Figure 3:
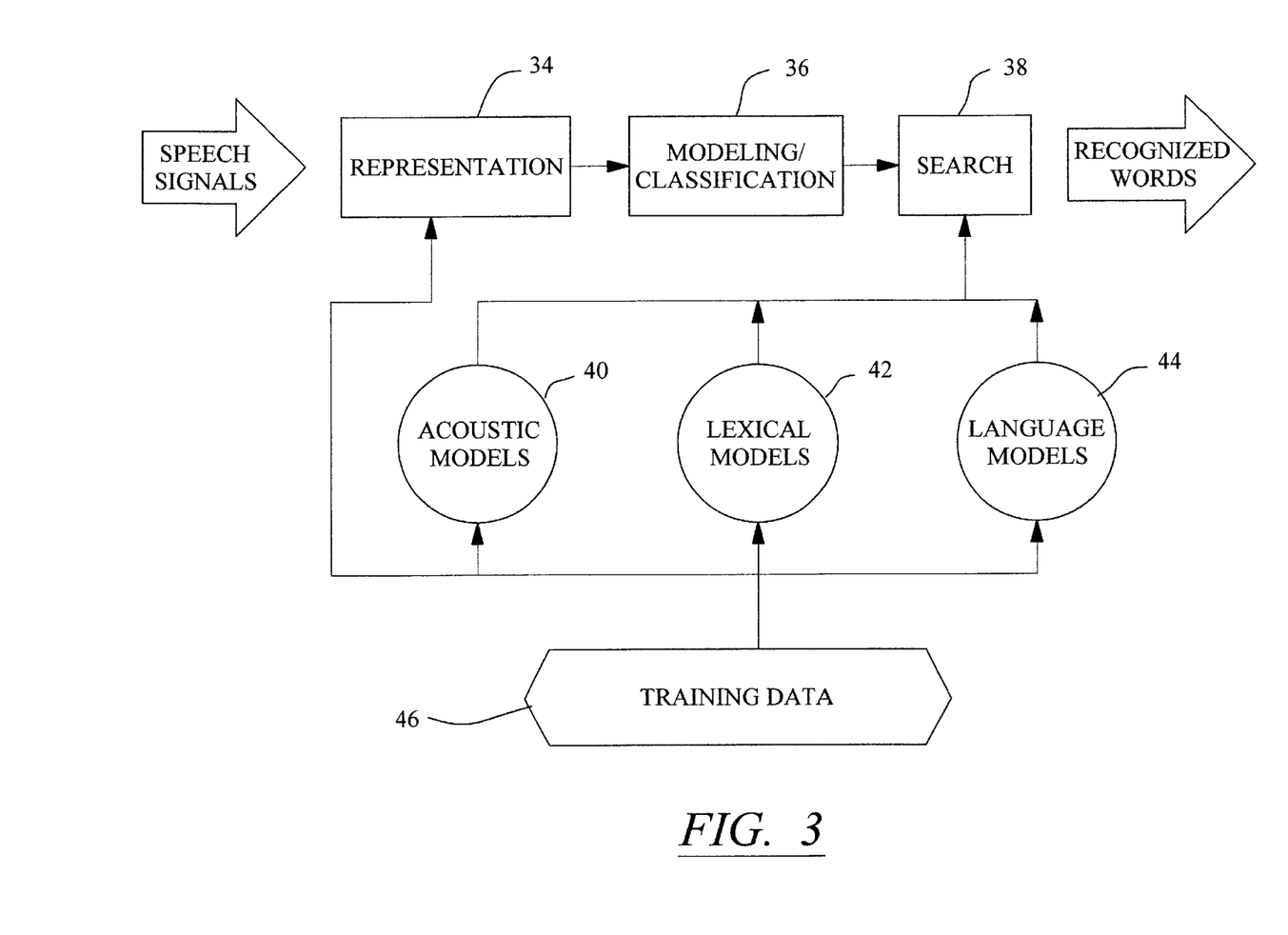
FIG. 3 is a block diagram showing a typical architecture for a speech recognition engine.

FIG. 3 is a block diagram showing typical components which comprise speech recognition application 26. As shown in FIG. 3 the speech recognition engine 26 receives a digitized speech signal from the operating system. The signal is subsequently transformed in representation block 34 into a useful set of data by sampling the signal at some fixed rate, typically every 10–20 msec. The representation block produces a new representation of the audio signal which can then be used in subsequent stages of the voice recognition process to determine the probability that the portion of waveform just analyzed corresponds to a particular phonetic event. This process is intended to emphasize perceptually important speaker independent features of the speech signals received from the operating system. In modeling/classification block 36, algorithms process the speech signals further to adapt speaker-independent acoustic models to those of the current speaker. Finally, in search block 38, search algorithms are used to guide the search engine to the most likely words corresponding to the speech signal. The search process in search block 38 occurs with the help of acoustic models 40, lexical models 42 and language models 44.

Language models 44 are used to help restrict the number of possible words corresponding to a speech signal when a word is used together with other words in a sequence. The language model can be specified very simply as a finite state network, where the permissible words following each word are explicitly listed, or can be implemented in a more sophisticated manner making use of context sensitive grammar. In any case, it is often desirable to update the content of the language model with information concerning speech patterns likely to be encountered in the case of a specific user. According to the preferred embodiment of the invention, the language model is updated making note of user corrections of misrecognized words in dictated text and using this information to update the language model.

One problem with updating the language model based upon the users corrections of misrecognized words is the need to make clear to the speech recognition application 26 which amendments to text are corrections to misrecognized words and which are merely additions or revisions to text. Corrections to misrecognized words are appropriately considered for updating the language model whereas other additions or revisions to text for other reasons are not necessarily so. However, it is cumbersome and inefficient to require a user to indicate the nature of an amendment on each occasion when the text is changed from that which was originally dictated. This problem is solved in accordance with the inventive arrangements by providing a system and method for automatically determining whether a user amendment to a document is intended to correct a misrecognized word or is simply a revision of the text as originally dictated.

FIG. 4 is a flow chart illustrating the various steps according to the method of the invention. The method is preferably implemented as part of the speech recognition engine application 26 as shall now be described. As shown in FIG. 4A, the process begins in step 50 by controlling the speech recognition engine application 26 and the speech text processor application 28 to place each of them in a text editing mode. In this mode, previously dictated text can be amended by a user to make any necessary corrections or edits. The editing process preferably is accomplished using a keyboard and mouse for this purpose. However, the invention is not limited in this regard, and the control over the keyboard and mouse to implement the necessary amendments to the text can also be accomplished using voice commands.

Figure 4A:
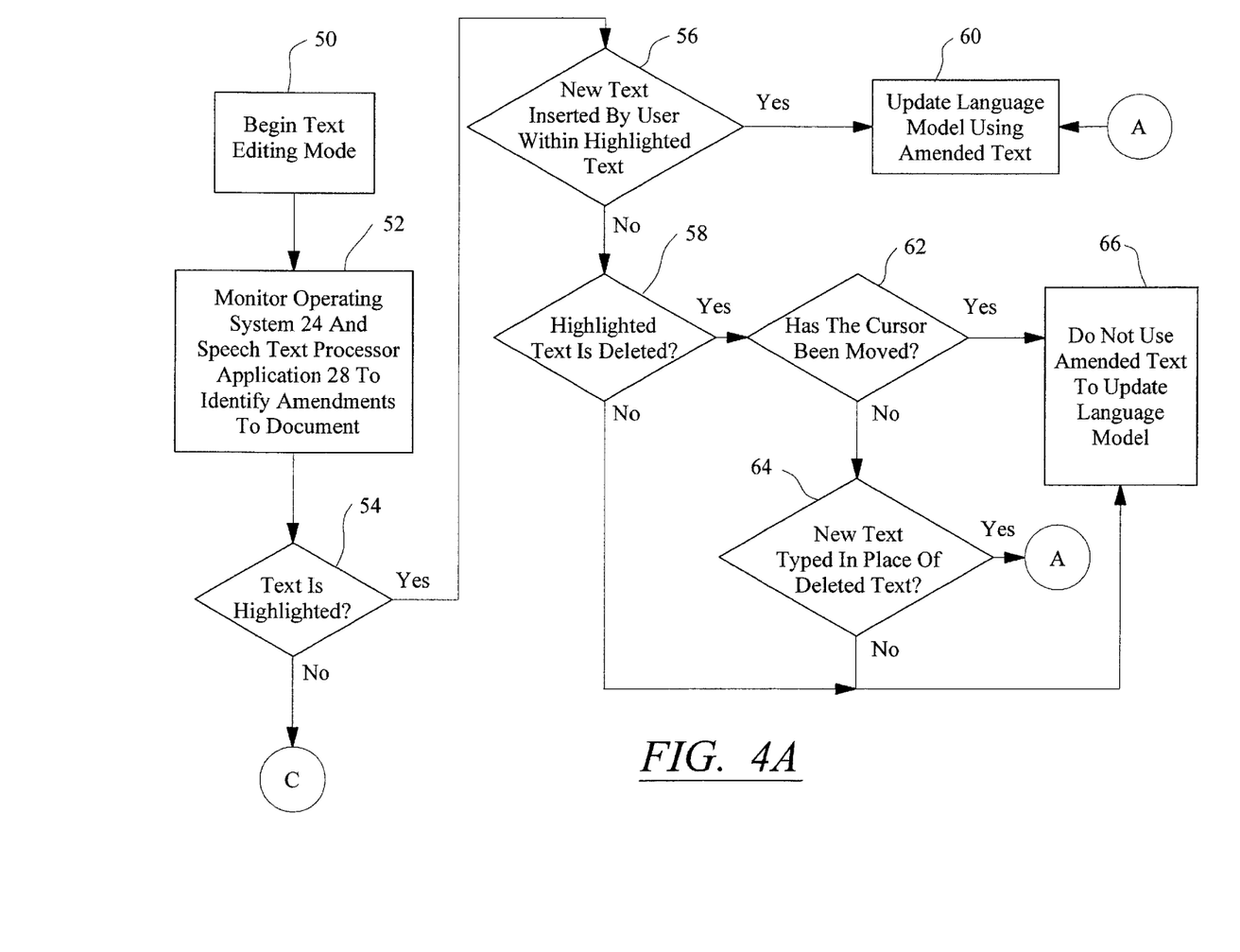
FIG. 4 is a flow chart illustrating a process for automatically determining whether an amendment to a document should be used as a basis for updating a language model.

As previously noted, the speech recognition engine application 26 and the speech text processor application 28 can be implemented in the form of distinct application programs or can be integrated to form a single, integrated, application. If the two applications are fully integrated, then operating system inputs from keyboard or mouse movements will be immediately accessible to the speech recognition application. It will be readily appreciated by those skilled in the art that in those instances where the speech recognition engine application 26 is designed independently of the speech text processor application, then suitable application hooks or interfaces must provided to permit the speech recognition engine application 20 to identify user keyboard inputs and mouse commands which are used to amend the dictated text in the speech text processor application 28. Similarly, the speech recognition application 26 preferably is provided with suitable means to identify specific words which are being edited by the user. This can be accomplished using various methods which are known to programmers skilled in the art. For example, the speech recognition engine application can use certain existing operating system hooks to insert itself into the speech text processor application. Further, the words in the dictated word processing document can be assigned identifying tags by the speech recognition application as they are inserted in the speech text processor application document. Thus, each word can be readily identified by the speech recognition engine application 26 if the user performs any amendment or editing function with respect thereto. In this way, the speech recognition engine 26 will also have knowledge of the specific words appearing adjacent to those amendments to the text. This information is useful for updating the language model.

In FIG. 4A, once the speech system is placed in the text editing mode, the operating system 24 and speech text processor application 28 are monitored in step 52 to identify any changes or amendments which can be made by the user. Such amendments will typically be achieved using conventional keyboard and mouse inputs. However, speech commands can also be used to simulate keyboard entries and mouse movements for amending the dictated text.

According to a preferred embodiment of the invention, the system will monitor the specific manner in which any changes or amendments are made to dictated text. As will hereinafter be explained in further detail, the system distinguishes correction of misrecognized words from mere insertions of text by analyzing the specific manner in which the user performs any such amendments. A suitable heuristic is applied to identify specific amendments which corrections to misrecognized words. The heuristic is based upon the specific series of keyboard, cursor and mouse movements caused to occur by a user when the dictated text appearing in a word processing document is to be amended.

Thus, in step 54, an initial determination is made as to whether certain dictated text has been highlighted or selected by a user. If so, then a second decision is made in step 56 as to whether new text has been inserted by the user within the highlighted text. If so, the system concludes that the existing word was misrecognized by the speech recognition engine and has been modified slightly by the user to form the correct word. In that case, it is appropriate to amend the language model 44 to associate the new word as modified by the user with the preceding text. Accordingly, this process is preferably carried out in step 60 by updating the language model using the correct word formed by the user.

If in step 56 new text is not inserted by the user within the highlighted text, the system then checks in step 58 to determine if the highlighted text has been deleted. If so, the system checks in steps 62 and 64 to determine if the cursor has not been moved and whether new text has been inserted in place of the deleted text. Under these circumstances, the system will understand that a misrecognized word has been deleted by a user and new text has been typed directly into the same location in the document. Accordingly, the new word is appropriately used to update the language model 44. If the highlighted or selected text is not deleted in step 58 or if the cursor is moved in step 62, the system will then conclude that the amended text should not be used to update the language model 44.

Figure 4B:
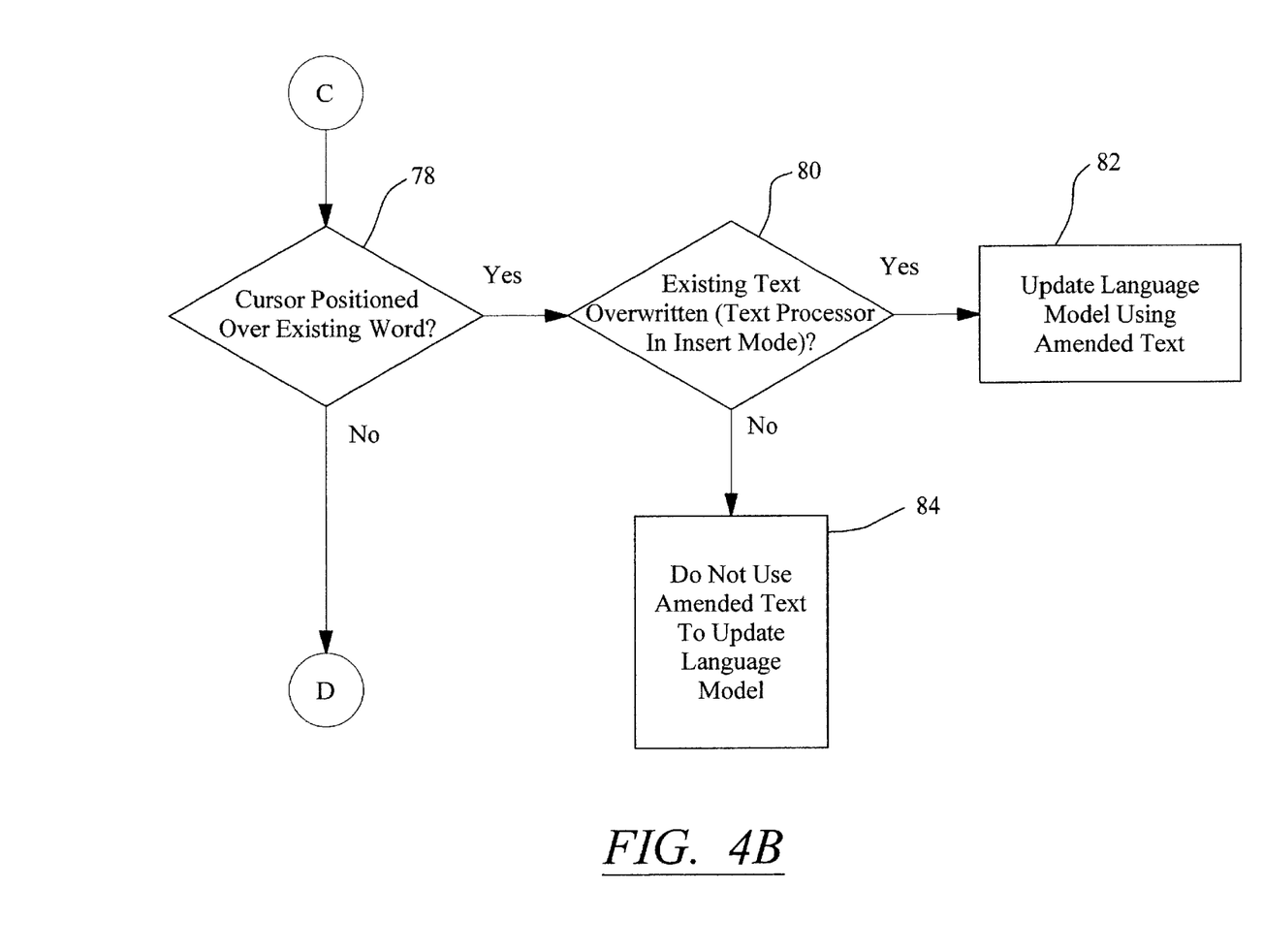
Figure 4C:
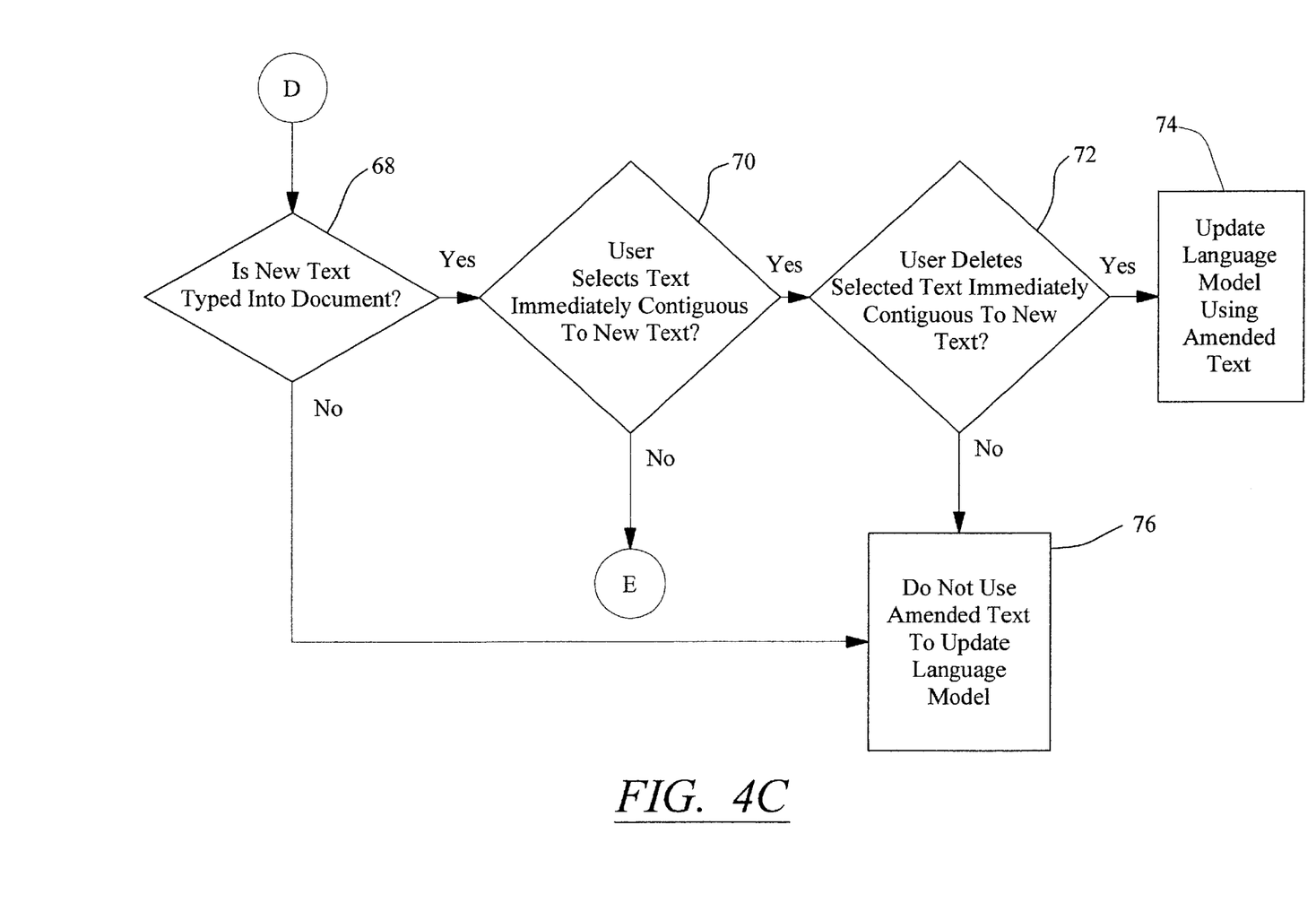
Figure 4D:
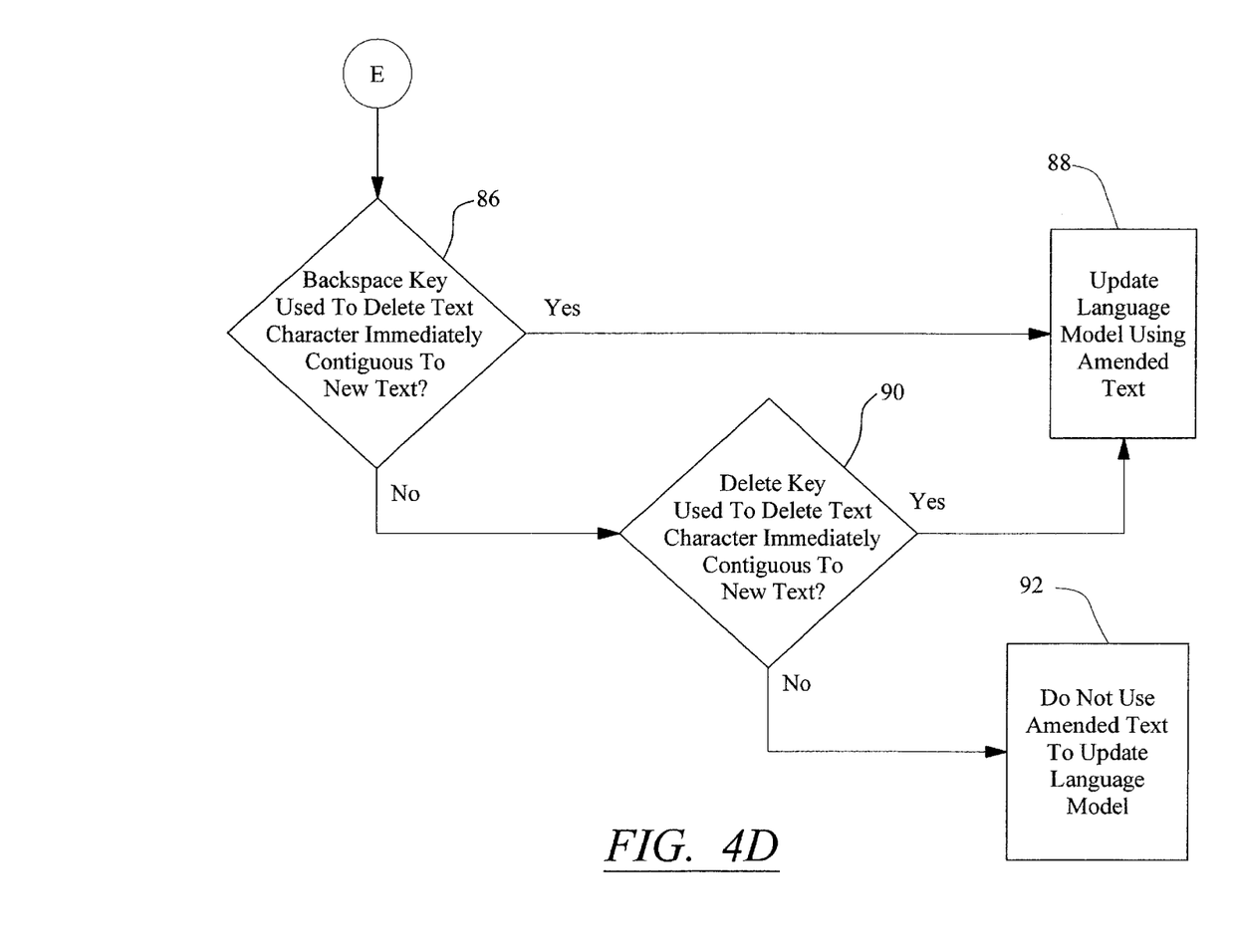

A similar process occurs in FIGS. 4B, 4C and 4D. In each case the system evaluates the specific manner in which a document has been amended by a user and makes a determination based on such evaluation to determine whether a misrecognized word has been corrected and consequently whether the language model 44 should be updated. In step 78 of FIG. 4B, the system determines whether a cursor is positioned over an existing word or text. If so, a decision is made in step 80 as to whether the existing text has been overwritten, as will occur when the speech text processor application 28 is in the conventional "typeover" mode. In this mode, existing text is automatically overwritten as new text is entered. If new text is being inserted without overwriting the existing text, it can be concluded that the new text is simply being added and that there was no misrecognized word. Accordingly the software proceeds to step 84 and does not use the amended text to update the language model. However, if the speech text processor application is in the typeover mode, it can then be concluded that the user has simply typed over an existing misrecognized word in the dictated text. In such instances, the new word is appropriately used to update the language model 44 in step 82. As an aside, it should be noted that the invention as described herein can be used with regard to changes in a single word or to a group of words comprising a phrase. In each case, the system will respond to the changes on a word by word basis for the purpose of determining whether to update the language model.

In step 68 of FIG. 4C, a decision is made as to whether new text is typed or otherwise inserted into the document. If so, then the software proceeds to step 70 and 72 where a determination is made as to whether the user has selected and then deleted text immediately contiguous to the new text which has been inserted. In such instances, the software presumes that a misrecognized word has been replaced and the language model is updated in step 74. Otherwise, the amended text is deemed unsuitable for updating the language model in step 76.

If the outcome of step 70 is negative, then in step 86 of FIG. 4D, a determination is made as to whether the backspace key has been used to delete text characters immediately contiguous to the new text entered in step 68. If so, the system again concludes that a misrecognized word has been corrected and updates the language model in step 88. Alternatively, if the backspace key has not been used, then a decision is made in step 90 to determine whether the delete key has been used to delete immediately contiguous text. If so, the language model is appropriately updated in step 88. Otherwise, the language model is not updated as indicated in step 92.

It will be noted by those skilled in the art that the foregoing system has the potential in certain instances to update the language model 44 when the user simply means to edit a word rather than correcting a misrecognized word. Significantly, however, such action will not have a detrimental effect on speech recognition accuracy since only the language model 44 and not the acoustic model 40 will be updated.

While the foregoing specification illustrates and describes the preferred embodiments of this invention, it is to be understood that the invention is not limited to the precise construction herein disclosed. The invention can be embodied in other specific for ms without departing from the spirit or essential attributes. Accordingly, reference should be made to the following claims, rather than to the foregoing specification, as indicating the scope of the invention.

What is claimed is:

1. In a computer speech dictation system, a method for automatically determining whether to update a language model based upon user amendments to dictated text in a word processing document, comprising the steps of:

monitoring an application program for at least one text-amending input;

determining whether said at least one text-amending input corrects a misrecognized word in the dictated text, or does not correct a misrecognized word in the dictated text; and, updating said language model based upon the at least one text-amending input if the text-amending input is determined to correct a misrecognized word.

2. The method according to claim 1 wherein the step of determining whether said at least one text-amending input corrects a misrecognized word in the dictated text comprises the steps of:

determining whether said at least one text amending input has caused dictated text to be selected; and, determining whether new text has been inserted within the selected text.

3. The method according to claim 1 further comprising the steps of:

determining whether said at least one text-amending input has caused a portion of said dictated text to be selected;

determining whether said selected text has been deleted by said at least one text amending input;

determining whether said cursor has not been moved; and determining whether a further text-amending input has caused new text to be inserted in place of said deleted text.

4. The method according to claim 1 further comprising:

determining whether said at least one text amending input has caused the positioning of a cursor over an existing word in said dictated text; and determining whether said existing word has been overwritten in a subsequent text amending input.

5. The method according to claim 1 further comprising:

determining whether said at least one text amending input is the addition of new text to said dictated text; and determining whether a further text amending input is the selection and deletion of text immediately contiguous to the new text.

6. The method according to claim 1 further comprising:

determining whether said at least one text amending input is the addition of new text to said dictated text; and determining whether a further text amending input is the deletion of text immediately contiguous to the new text by operation of at least one of a delete key and a backspace key.

7. A system for automatically determining whether to update a language model of a speech recognition engine based upon user amendments to dictated text in a word processing document, comprising:

monitoring means for monitoring an application program for at least one text-amending input;

processing means responsive to said monitoring means for determining whether said at least one text-amending input corrects a misrecognized word in said dictated text, or does not correct a misrecognized word in said dictated text; and, updating means responsive to said processing means for updating a language model based upon the text which has been amended if said at least one text amending input is determined to correct a misrecognized word.

8. The system according to claim 7 wherein said processing means further comprises:

means for determining whether said at least one text-amending input has caused dictated text to be selected and for determining whether new text has been inserted within the selected text.

9. The system according to claim 7 wherein said processing means further comprises means for determining whether said at least one text amending input has caused dictated text to be selected, for determining whether said selected text has been deleted by said at least one text amending input, for determining whether said cursor has not been moved, and for determining whether said at least one text-amending input has caused new text to be inserted in place of said deleted text.

10. The system according to claim 7 wherein said processing means further comprises:

means for determining whether said at least one text amending input is the positioning of a cursor over an existing word in said dictated text and subsequently determining whether said existing word has been overwritten by a subsequent text amending input.

11. The system according to claim 7 wherein said processing means further comprises:

means for determining whether said at least one text amending input is the addition of new text to said dictated text and subsequently determining whether a further text amending input is the selection and deletion of text immediately contiguous to the new text.

12. The system according to claim 7 wherein said processing means further comprises:

means for determining whether said at least one text amending input is an addition of new text to said dictated text and subsequently determining whether a further text amending input is the deletion of text immediately contiguous to the new text by operation of at least one of a delete key and a backspace key.

13. A machine readable storage, having stored thereon a computer program having a plurality of code sections executable by a machine for causing the machine to perform the steps of:

monitoring an application program for at least one text-amending input to for amending text which has been created by dictation to a speech recognition engine;

determining whether said at least one text-amending input corrects a misrecognized word in the dictated text, or does not correct a misrecognized word in the dictated text; and, updating said language model based upon the at least one text-amending input if the text-amending input is determined to correct a misrecognized word.

14. The machine readable storage according to claim 13 for further causing said machine to perform the steps of:

determining whether said at least one text amending input has caused dictated text to be selected; and determining whether new text has been inserted within the selected text.

15. The machine readable storage according to claim 13 for further causing said machine to perform the steps of:

determining whether said at least one text amending input has caused dictated text to be selected;

determining whether said selected text has been deleted by said at least one text amending input;

determining whether said cursor has not been moved; and determining whether a further text-amending input has caused new text to be inserted in place of said deleted text.

16. The machine readable storage according to claim 13 for further causing said machine to perform the steps of:

determining whether said at least one text amending input has caused the positioning of a cursor over an existing word in said dictated text; and determining whether said existing word has been overwritten in a subsequent text amending input.

17. The machine readable storage according to claim 13 for further causing said machine to perform the steps of:

determining whether said at least one text amending input is the addition of new text to said dictated text; and determining whether a further text amending input is the selection and deletion of text immediately contiguous to the new text.

18. The machine readable storage according to claim 13 for further causing said machine to perform the steps of:

determining whether said at least one text amending input is the addition of new text to said dictated text; and determining whether a further text amending input is the deletion of text immediately contiguous to the new text by operation of at least one of a delete key and a backspace key.

* * * * *